United States Patent [19]

Brown

[11] Patent Number: 4,882,522
[45] Date of Patent: Nov. 21, 1989

[54] NEON CIRCUIT MALFUNCTION DETECTOR

[75] Inventor: Roger A. Brown, League City, Tex.

[73] Assignee: Irin Paris, Houston, Tex. ; a part interest

[21] Appl. No.: 173,303

[22] Filed: Mar. 25, 1988

[51] Int. Cl.⁴ .......................... H05B 37/00; H02H 3/18
[52] U.S. Cl. .................................... 315/119; 315/159; 361/86; 361/91
[58] Field of Search .................... 315/119, 159, 362; 361/86, 91, 35, 112

[56] References Cited

U.S. PATENT DOCUMENTS

| | | | |
|---|---|---|---|
| 1,677,692 | 7/1927 | Stokes | 361/35 |
| 2,463,812 | 9/1945 | Seaman | 315/119 |
| 2,542,367 | 11/1945 | Seaman | 361/35 |
| 3,048,833 | 8/1962 | Bernheim | 315/159 |
| 3,764,853 | 10/1973 | Beachley | 317/18 |
| 3,965,393 | 6/1976 | Chamberlain | 317/16 |
| 4,175,255 | 11/1979 | Linman et al. | 328/7 |
| 4,205,358 | 5/1980 | Washington | 361/44 |
| 4,206,385 | 6/1980 | Wisbey | 315/119 |
| 4,207,500 | 6/1980 | Duve et al. | 315/119 |
| 4,415,944 | 11/1983 | Walker | 361/42 |

Primary Examiner—Eugene R. LaRoche
Assistant Examiner—Truc Nguyen
Attorney, Agent, or Firm—Vaden, Eickenroht, Thompson & Boulware

[57] ABSTRACT

A neon sign circuit is disclosed having a neon tube forming the lighted portion of the sign, a source of electrical power, and a high voltage transformer between the electrical power source and the neon tube. The circuit also includes a neon sign circuit malfunction detector circuit. This circuit includes a ground fault detector connected in the circuit between the source of power and the transformer, to ground, and to the neutral load side of the primary windings of the transformer. A pair of adjustable spark gaps are each connected to one of the secondary windings of the transformer between the transformer and the neon tube. A light source is connected between each spark gap and ground and light sensitive resistors are positioned adjacent to each light source. The resistors are connected between the ground connection of the ground fault detector and the neutral load connection between the transformer and the ground fault detector so that when a malfunction in the neon sign circuit occurs, a spark will jump one of the spark gaps to energize the light source, increase the resistance of the light sensitive resistor and cause the ground fault detector to cut off power to the transformer, as if it was sensing a ground fault.

5 Claims, 2 Drawing Sheets

NEON CIRCUIT MALFUNCTION DETECTOR

This invention relates to a circuit for detecting a malfunction in a neon sign circuit generally, and in particular to such a circuit that will cut off power to the neon sign circuit when such a malfunction occurs.

A neon sign circuit normally includes a neon tube forming the lighted portion of a sign, etc., a source of electrical power, and a high voltage transformer between the electrical power source and the neon power tube. Should the neon tube break, or a wire connecting the power source to the neon tube come loose, or if this loose wire falls to a grounded article, a potentially dangerous condition will exist.

For example, if the neon tube breaks, but no short circuit occurs, the transformer is overheated because of a neutral (no) load condition and can cause a fire if the high heat melts down the transformer insulation. The same condition exists when a wire comes loose but no short occurs. When a wire comes loose from the neon tube's electrode and connects the transformer's output secondary to ground, the high voltage will cause a high voltage arc and very likely start a fire.

It is an object of this invention to provide a neon sign circuit malfunction detector circuit that will sense when anyone or any combination of the three things described above occur and cut off power to the neon tube, by disconnecting the transformer's primary from input power.

It is a further object and advantage of this invention to provide such a malfunction detector for a neon sign circuit that can be adjusted for the particular load of the neon sign circuit with which it is associated. The load varies with the size of the transformer, the number of neon tubes, the length of the tubes and the diameter of the tubes.

It is a further object and advantage of this invention to provide a neon sign circuit malfunction detector circuit that includes a ground fault detector connected in the circuit between the source of power and the transformer that will be actuated to cut off power to the neon sign circuit when anyone or any combination of the three events described above occur.

It is a further object of this invention to provide such a malfunction detector circuit that includes a ground fault interrupter circuit and an adjustable spark gap on the secondary side of the transformer that is adjusted so that no spark occurs during normal operation of the neon sign circuit but that will cause a spark to jump the gap when anyone or any combination of the three events described above occur, at which time the voltage jumping produced by the spark gap will light a neon glow lamp that is in direct proximity to a photo resistor thereby changing the resistance from low resistance to high resistance causing the ground fault interrupter circuit to cut off power to the neon sign circuit because the ground fault interrupter circuit interprets this as a ground fault.

These and other objects, advantages, and features of this invention will be apparent to those skilled in the art from a consideration of the specification, including the attached drawings and appended claims. In the drawings:

Figure 1:
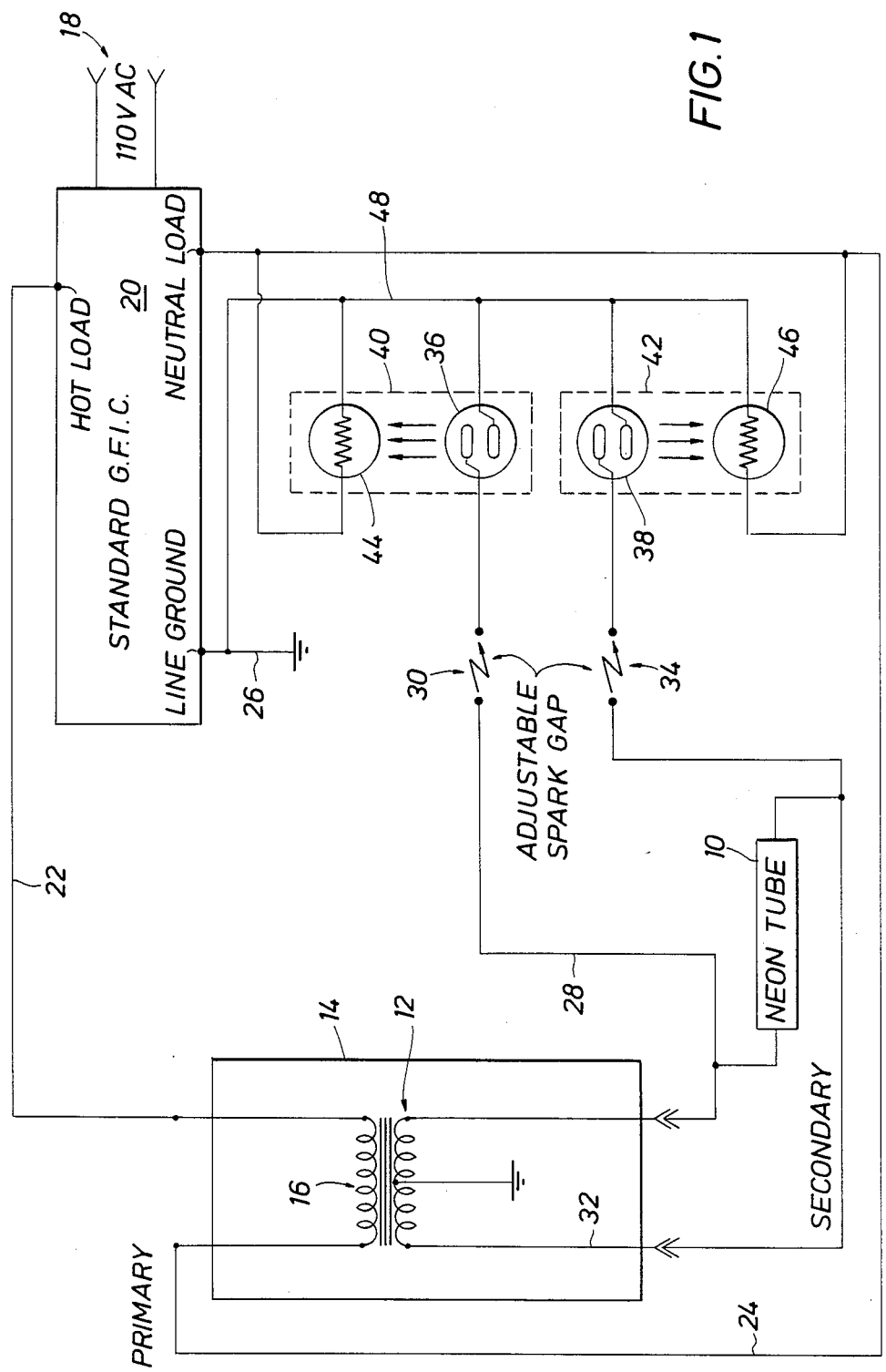
FIG. 1 is a circuit diagram of a neon tube circuit equipped with the malfunction detector circuit of this invention.

In the usual neon tube circuit, power is supplied to the neon tube through a high voltage transformer, the neon tube being connected across the secondary of the transformer. This is true of the circuit shown in FIG. 1 where neon tube 10 is connected across secondary winding 12 of high voltage transformer 14. Primary winding 16 of the transformer is connected to power source 18 through ground fault interrupter circuit 20. Ground fault interrupter circuits are well-known and so the circuit is indicated diagrammatically. Power from the power source is provided to primary windings of the transformer through conductor 22 connected to the power output terminal of the ground fault interrupter circuit. The other side of primary 16 is connected to the neutral load terminal of the ground fault interrupting circuit through conductor 24. The ground fault circuit is connected to ground through conductor 26.

In accordance with this invention, each side of the secondary winding is connected to an adjustable spark gap. Specifically, conductor 28 is connected to one side of spark gap 30 and conductor 32 is connected to one side of spark gap 34. The other side of spark gap 30 is connected to neon light emitting source 36. Spark gap 34 is connected to similar neon light admitting source 38. Each light emitting source is located in a housing, such as housings 40 and 42 along with photosensitive resistors 44 and 46. Housings 40 and 42 enclose the neon light and photosensitive resistors so that no light from outside can enter the housing to make sure that they are affected only when light is produced by the neon light emitting source located in the housing with them. The photo sensitive resistors are connected to ground 26 through conductor 48. Each photo sensitive resistor is also connected to the neutral side of primary coil 16.

Figure 2:
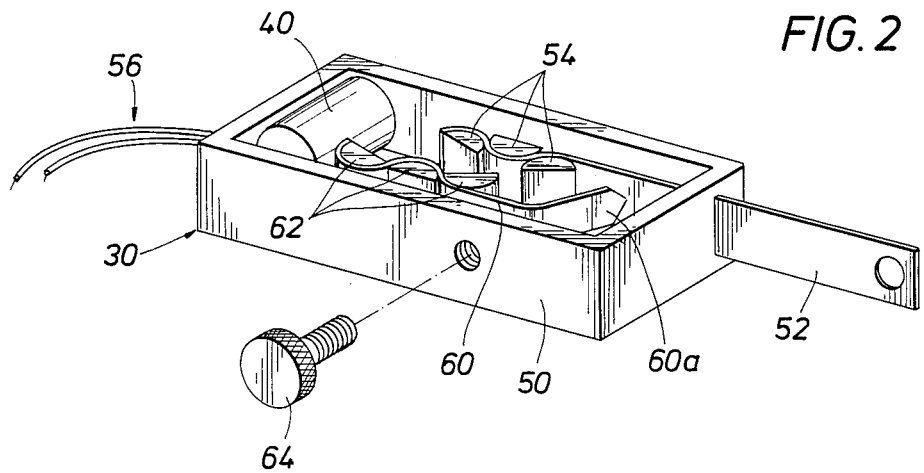
FIG. 2 is an isometric drawing of the adjustable spark gap assembly employed in the malfunction detector circuit of this invention.
Figure 3:
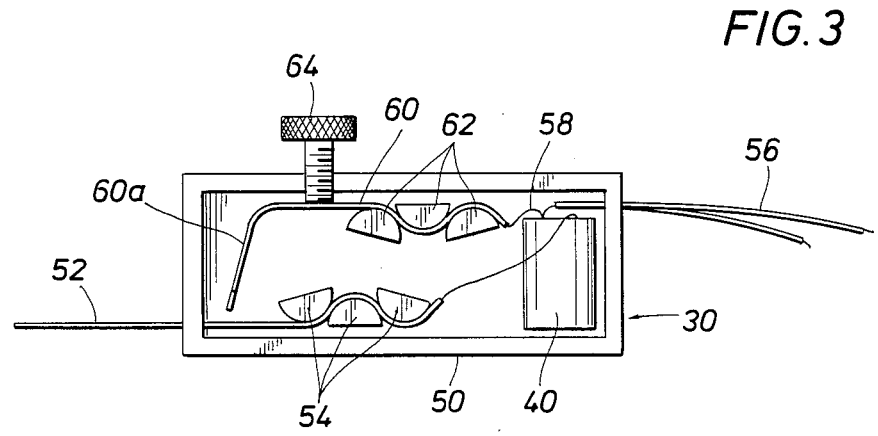
FIG. 3 is a cross-section of the spark gap assembly of FIG. 2.

Adjustable spark gap assembly 30 is shown in FIGS. 2 and 3. Adjustable spark gap assembly 34 is of the same construction. The assembly includes copper strip 52 having one end shaped to be held in the housing 50 against longitudinal movement by posts 54 that are attached to the bottom of the housing. Strip 52 extends out of the housing to be connected electrically to the secondary of the transformer. Neon light 36 is located in housing 40. Also located in housing 40 is photosensitive resistor 44. Conductors 56 connect the neon light and the resistor into the circuit as shown in FIG. 1.

Conductor 58 connects the neon light to one end of strip 60 of electrically conducting material, such as copper. Strip 60 is held in the housing in the same manner as strip 52 by posts 62. End 60a of the strip is bent toward strip 52. The spark gap is the space between the end of strip 60. This can be adjusted by rotating screw 64 mounted in the wall of housing 50.

In operation, with power being supplied to the neon tube, the adjustable spark gap assemblies 30 and 34 are adjusted until a spark jumps across the gap. The gap is then widened a preselected amount so that during normal operations the voltage across the spark gaps will not produce a spark. Should a short or similar malfunction occur in the neon tube circuit causing an increase in voltage, a spark will jump across one or the other or both of the spark gaps causing one or the other or both of the light emitting devices 36 and 38 to emit sufficient light to cause the resistance of photo sensitive resistors 44 and 46 to increase. This sends a signal to the ground fault interrupter circuit that there has been a ground change in the circuit similar to a fault and the ground fault interrupter circuit will cut off power to the transformer.

Figure 4:
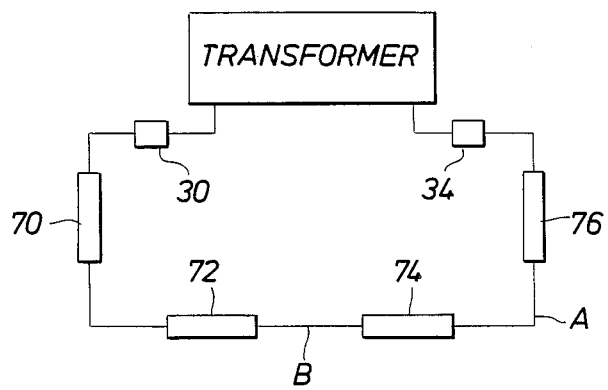
FIG. 4 is a simplified circuit diagram for explaining the reason for providing two spark gap assemblies.

The spark gap assemblies should be on opposite sides of the balanced resistance loop. As shown in FIG. 4, four neon tubes 70, 72, 74, and 76 make up the circuit. With spark gap assemblies 30 and 34 located on opposite sides of the load and balanced point B, at least one will function. For example, a short at A will cause spark gap assembly 34 to trip, but spark gap assembly 30 may not. So, preferably, two spark gap assemblies are used with each assembly located on opposite sides of the balance point in the circuit. In the event of an open circuit, such as when a tube breaks or when one of the leads is disconnected but no short occurs, both spark gap assemblies will trip simultaneously.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. In a neon sign circuit having a neon tube forming the lighted portion of the sign, a source of electrical power, and a high voltage transformer between the electrical power source and the neon tube, the improvement comprising a neon sign circuit malfunction detector circuit including a ground fault detector connected in the circuit between the source of power and the transformer, to ground, and to the neutral load side of the primary windings of the transformer, a spark gap assembly connected to one of the secondary windings of the transformer between the transformer and the neon tube, said spark gap assembly including a spark gap, a neon light source connected between the spark gap and ground, and a light sensitive resistor positioned relative to the light source and connected between the ground connection of the ground fault detector and the neutral load connection between the transformer and the ground fault detector so that when a malfunction in the neon sign circuit occurs, a spark will jump the spark gap to energize the light source, increase the resistance of the light sensitive resistor and cause the ground fault detector to cut off power to the transformer, as if it was sensing a ground fault.

2. The neon sign circuit of claim 1 further provided with a second spark gap assembly and in which the spark gap assemblies are located in the neon sign circuit on opposite sides of the neon tubes.

3. The neon sign circuit of claim 1 in which the spark gap assembly has an adjustable spark gap.

4. In a neon sign circuit having a neon tube forming the lighted portion of the sign, a source of electrical power, and a high voltage transformer between the electrical power source and the neon tube, the improvement comprising a neon sign circuit malfunction detector circuit including a ground fault detector connected in the circuit between the source of power and the transformer, to ground, and to the neutral load side of the primary windings of the transformer, a pair of adjustable spark gaps, each connected to one of the secondary windings of the transformer between the transformer and the neon tube, a neon light source connected between each spark gap and ground, light sensitive resistors positioned relative to each light source and connected between the ground connection of the ground fault detector and neutral load connection between the transformer and the ground fault detector so that when a malfunction in the neon sign circuit occurs, a spark will jump one of the spark gaps to energize the light source, increase the resistance of the light sensitive resistor and cause the ground fault detector to cut off power to the transformer, as if it was sensing a ground fault.

5. The neon sign circuit of claim 4 in which the spark gap assemblies are located in the neon sign circuit on opposite sides of the neon tubes.

* * * * *